United States Patent
Hodges et al.

(10) Patent No.: US 9,444,929 B2
(45) Date of Patent: Sep. 13, 2016

(54) MOBILE DEVICE USAGE ACTIVITY REPORTING SYSTEM AND METHOD

(71) Applicant: WaveMarket, Inc., Emeryville, CA (US)

(72) Inventors: Daniel Hodges, San Francisco, CA (US); Tasos Roumeliotis, Orinda, CA (US)

(73) Assignee: Location Labs, Inc., Emeryville, CA (US)

( * ) Notice: Subject to any disclaimer, the term of this patent is extended or adjusted under 35 U.S.C. 154(b) by 62 days.

(21) Appl. No.: 14/324,938

(22) Filed: Jul. 7, 2014

(65) Prior Publication Data

US 2016/0006861 A1 Jan. 7, 2016

(51) Int. Cl.
| | |
|---|---|
| H04M 1/725 | (2006.01) |
| H04M 15/00 | (2006.01) |
| H04W 4/02 | (2009.01) |
| G06Q 50/18 | (2012.01) |
| G06Q 10/10 | (2012.01) |
| H04M 3/42 | (2006.01) |

(52) U.S. Cl.
CPC ......... *H04M 1/72577* (2013.01); *G06Q 10/10* (2013.01); *G06Q 50/18* (2013.01); *H04M 1/72569* (2013.01); *H04M 1/72572* (2013.01); *H04M 3/42348* (2013.01); *H04M 3/42357* (2013.01); *H04M 15/61* (2013.01); *H04W 4/02* (2013.01)

(58) Field of Classification Search
CPC ..... H04W 24/02; H04W 4/02; H04W 48/02; H04W 24/08; H04W 64/006; H04W 4/027; H04W 4/008; H04W 48/04; H04M 1/72577; H04M 1/72572; G01S 19/13; G01S 5/02
See application file for complete search history.

(56) References Cited

U.S. PATENT DOCUMENTS

| | | | |
|---|---|---|---|
| 5,833,479 A | 11/1998 | Talbot | |
| 6,690,940 B1 | 2/2004 | Brown et al. | |
| 7,248,961 B2 | 7/2007 | Park et al. | |
| 7,493,655 B2 * | 2/2009 | Brown ................... | G06Q 30/02 705/7.34 |
| 7,593,740 B2 | 9/2009 | Crowley et al. | |
| 7,606,772 B2 | 10/2009 | Flinn et al. | |
| 7,705,726 B2 | 4/2010 | Graves et al. | |
| 7,876,704 B1 | 1/2011 | Bims et al. | |
| 7,881,864 B2 | 2/2011 | Smith | |
| 8,073,907 B2 | 12/2011 | Roumeliotis et al. | |
| 8,095,175 B2 | 1/2012 | Todd et al. | |
| 8,107,432 B2 | 1/2012 | Seo | |
| 8,145,240 B2 | 3/2012 | Roumeliotis et al. | |
| 8,229,421 B2 | 7/2012 | Hotes et al. | |
| 8,244,236 B2 | 8/2012 | Roumeliotis et al. | |
| 8,351,408 B2 | 1/2013 | Daigle | |

(Continued)

*Primary Examiner* — Magdi Elhag
(74) *Attorney, Agent, or Firm* — Dovas Law, P.C.

(57) ABSTRACT

A system and method for reporting mobile device usage activity. The method includes monitoring location data and/or sensor data of a particular mobile device corresponding to a particular user and monitoring usage activity occurring on the particular mobile device, the usage activity including voice communication, electronic messaging, and application usage. A processor determines whether the particular mobile device is operating in a moving vehicle based on the location data and/or the sensor data. It is further determined whether the usage activity occurs while the particular mobile device is operating in a moving vehicle. A report is generated and provided indicating whether the usage activity occurs while the particular mobile device is operating in a moving vehicle.

29 Claims, 5 Drawing Sheets

(56) References Cited

U.S. PATENT DOCUMENTS

| | | | |
|---|---|---|---|
| 8,509,814 B1* | 8/2013 | Parker | H04M 3/42 455/414.2 |
| 8,948,790 B1* | 2/2015 | Kim | H04W 4/046 455/41.1 |
| 2004/0122734 A1 | 6/2004 | Schleicher et al. | |
| 2005/0136949 A1* | 6/2005 | Barnes, Jr. | G06Q 10/1053 455/461 |
| 2005/0195193 A1 | 9/2005 | Lehman | |
| 2006/0200435 A1 | 9/2006 | Flinn et al. | |
| 2006/0270421 A1 | 11/2006 | Phillips et al. | |
| 2007/0218900 A1 | 9/2007 | Abhyanker | |
| 2008/0146250 A1 | 6/2008 | Aaron | |
| 2008/0252487 A1* | 10/2008 | McClellan | G01S 5/0027 340/936 |
| 2009/0002147 A1 | 1/2009 | Bloebaum et al. | |
| 2009/0085728 A1* | 4/2009 | Catten | H04K 3/415 340/425.5 |
| 2010/0148920 A1* | 6/2010 | Philmon | H04M 1/67 340/5.2 |
| 2010/0210254 A1 | 8/2010 | Kelly et al. | |
| 2010/0241709 A1 | 9/2010 | Roumeliotis et al. | |
| 2010/0306138 A1 | 12/2010 | Hotes et al. | |
| 2011/0016514 A1* | 1/2011 | De Carlo | H04Q 9/00 726/5 |
| 2011/0021234 A1* | 1/2011 | Tibbitts | H04W 48/04 455/517 |
| 2011/0093161 A1 | 4/2011 | Zhou et al. | |
| 2011/0105082 A1* | 5/2011 | Haley | H04M 1/72577 455/411 |
| 2011/0151830 A1 | 6/2011 | Blanda et al. | |
| 2011/0228753 A1 | 9/2011 | Polito et al. | |
| 2011/0275321 A1 | 11/2011 | Zhou et al. | |
| 2011/0281564 A1* | 11/2011 | Armitage | G07C 5/085 455/414.1 |
| 2011/0294520 A1 | 12/2011 | Zhou et al. | |
| 2012/0001548 A1 | 1/2012 | Recker et al. | |
| 2012/0077523 A1 | 3/2012 | Roumeliotis et al. | |
| 2012/0081500 A1 | 4/2012 | Border et al. | |
| 2012/0100866 A1* | 4/2012 | Grossman | H04W 4/028 455/456.1 |
| 2012/0135756 A1 | 5/2012 | Rosso et al. | |
| 2012/0188163 A1 | 7/2012 | Xiao | |
| 2012/0223861 A1 | 9/2012 | Kupfer et al. | |
| 2012/0244883 A1 | 9/2012 | Tibbitts et al. | |
| 2013/0166209 A1* | 6/2013 | Pollington | G06Q 10/06 701/540 |
| 2013/0210406 A1* | 8/2013 | Vidal | H04W 4/00 455/418 |
| 2013/0217331 A1* | 8/2013 | Manente | H04W 4/008 455/41.2 |
| 2013/0281079 A1* | 10/2013 | Vidal | H04W 8/22 455/418 |
| 2013/0310078 A1* | 11/2013 | Raman | H04W 4/021 455/456.3 |
| 2014/0087708 A1* | 3/2014 | Kalita | H04W 4/04 455/418 |
| 2014/0148192 A1* | 5/2014 | Hodges | H04W 4/025 455/456.1 |
| 2014/0179348 A1* | 6/2014 | Simon | H04W 4/027 455/456.1 |
| 2016/0044156 A1 | 2/2016 | Hodges | |

* cited by examiner

MOBILE DEVICE USAGE ACTIVITY REPORTING SYSTEM AND METHOD

BACKGROUND

Laws throughout the country restrict how people are allowed to use their mobile communication devices (e.g., cellular phones) while they're driving. Police in turn are enforcing these restrictions and issuing costly tickets. It is possible that police occasionally make mistakes and incorrectly suspect a driver of using their phone illegally even when they were not. Moreover, different states and municipalities may enforce different laws or regulations making it difficult for a driver to know what use restrictions apply when driving in a particular area.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method of reporting device usage activity is provided. The method includes monitoring location data and/or sensor data of a particular mobile device corresponding to a particular user and monitoring usage activity occurring on the particular mobile device, the usage activity including voice communication, electronic messaging, and application usage. A processor determines whether the particular mobile device is operating in a moving vehicle based on the location data and/or the sensor data. It is further determined whether the usage activity occurs while the particular mobile device is operating in a moving vehicle. A report is generated and provided indicating whether the usage activity occurs while the particular mobile device is operating in a moving vehicle.

A method for reporting device usage activity of a plurality of mobile devices is provided. The method includes monitoring location data and/or sensor data of a plurality of mobile devices corresponding to a plurality of users and monitoring usage activity occurring on the plurality of mobile devices, the usage activity including voice communication, electronic messaging, and application usage. It is determined whether the plurality of mobile devices are operating in respective moving vehicles based on the location data and/or the sensor data. It is determining whether the usage activity occurs while the plurality of mobile devices are operating in respective moving vehicles. It is further determined where the monitored usage activity occurs based on the location data and/or the sensor data of the plurality of mobile devices. Data is reported including an indication of where the monitored usage activity corresponds to the plurality of mobile devices operating in respective moving vehicles.

A mobile computing device is provided comprising a non-transitory computer readable storage medium having encoded thereon instructions that, when executed by one or more processors, cause the particular mobile device to perform a process. The process includes monitoring location data and/or sensor data of the mobile computing device corresponding to a particular user, determining whether the mobile computing device is operating in a moving vehicle based on the location data and/or the sensor data. Usage activity occurring on the mobile computing device is monitored, the usage activity including voice communication, electronic messaging, and application usage. It is determined whether the usage activity occurs while the mobile computing device is operating in a moving vehicle. A report is generated indicating whether the usage activity occurs while the mobile computing device is operating in a moving vehicle. The report is provided responsive to a request for the report.

Non-transitory computer-readable media tangibly embodying a program of instructions executable by a processor to implement a method is provided. The method includes monitoring location data and/or sensor data of a mobile computing device corresponding to a particular user, determining whether the mobile computing device is operating in a moving vehicle based on the location data and/or the sensor data. Usage activity occurring on the mobile computing device is monitored, the usage activity including voice communication, electronic messaging, and application usage. It is determined whether the usage activity occurs while the mobile computing device is operating in a moving vehicle. A report is generated indicating whether the usage activity occurs while the mobile computing device is operating in a moving vehicle. The report is provided responsive to a request for the report.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Figure 1:
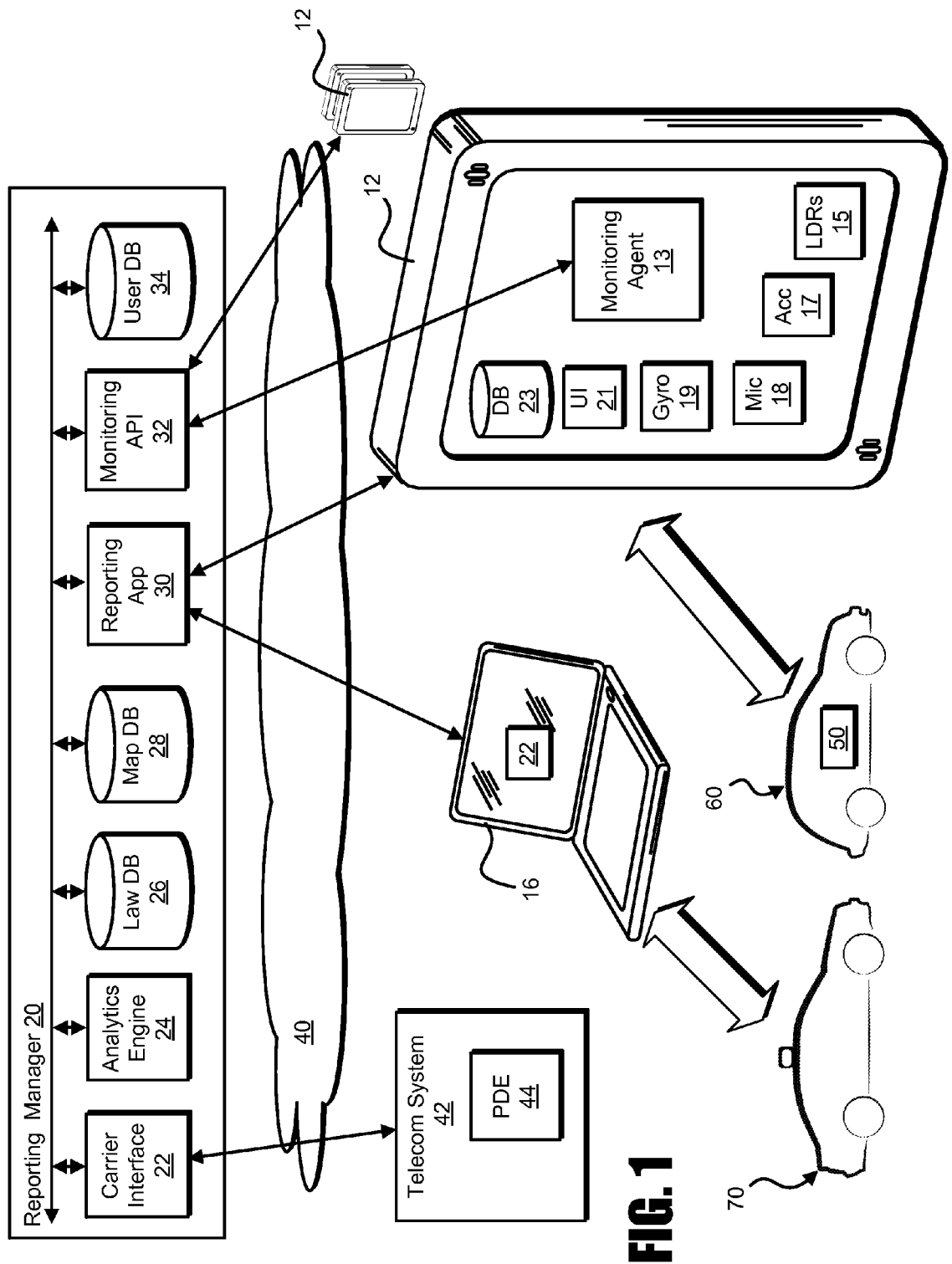
FIG. 1 is a diagram showing components of a systems for reporting mobile device usage activity.

Embodiments of the invention are described below with reference to the drawing figures wherein like numerals represent like elements throughout.

Referring to FIG. 1, a reporting manager 20 is configured to acquire data from processor-enabled mobile communication devices ("mobile devices") 12. The reporting manager 20 can function in a communications network 40, preferably including one or more wired or wireless networks or a combination thereof, which enables communication with the mobile devices 12. The reporting manager 20 and its constituent elements are preferably implemented on one or more network connectable processor-enabled computing systems via hardware components, software components sharing one or more processing units, or a combination hardware and software components. The reporting manager 20 need not be implemented on a single system at a single location, but can be decentralized such as in a peer-to-peer configuration, for example operating on two or more of the mobile devices 12. As described herein a processor can include one or more components installed on a particular computer system or a plurality of computing systems.

The reporting manager 20 enables a reporting application 30, a monitoring application program interface ("API") 32, an analytics engine 24, a mapping datastore 28, and a user database 34. The reporting manager 20 communicates via the network 40 with a mobile device 12 via a monitoring agent 13 enabled by an application and/or hardware installed on the mobile device 12. The mobile device 12 can include for example a smartphone or other cellular enabled mobile device preferably configured to operate on a wireless telecommunication network. Alternatively, the reporting manager 20 or one or more components thereof can be executed on the monitored mobile communication device 12 or other system or a plurality of systems. The reporting application 30 includes a web application or other application enabled by the reporting manager 20 and accessible to the mobile device 12 or other computing device 16 via a network and/or executed by the mobile device 12 or computing device 16.

Software and/or hardware residing on a monitored mobile device 12 enables the monitoring agent 13 to monitor mobile device location data, sensor data and usage activity and provide this information or computations based on this information to the reporting manager 20 via the monitoring API 32. A standalone application or an application integral with an operating system of the mobile device 12 can be executed to enable the monitoring agent 13 on the mobile device 12.

In addition to components enabling wireless communication, the mobile device 12 includes location determining resources ("LDRs") 15. The location determining resources 15 can include dedicated chipsets, for example a dedicated GPS, AGPS, or AFLT chipset, or alternatively can be a part of a multi-function chipset, for example a software-enabled mobile device CPU. The monitoring agent 13 is configured to use data from one or more of the location determining resources 15 to determine whether the mobile device is operating in a moving vehicle. A location resource need not provide precise location but can for example provide signal data from terrestrial sources (e.g. Wifi™, Bluetooth™, cell tower signals) or satellite sources, which signal data can be used by the monitoring agent 13 to predict movement of the mobile device 12.

The mobile device 12 is further provided with sensors including an accelerometer 17, a microphone 18, and a gyro-sensor 19 from which the monitoring agent 13 gathers data to determine whether the mobile device 12 is in operating in a moving vehicle, or more particularly whether a user of the mobile device 12 is driving a vehicle. It should be understood that the sensors described herein are exemplary and other device sensors can be employed in the determining whether the mobile device 12 is in operating in a moving vehicle or driving a vehicle. A monitored user carries the mobile device 12 on their person and selectively activates the monitoring agent 13 or configures the mobile device 12 to allow the monitoring agent 13 to remain active whenever the mobile device 12 is in an operating state.

Figure 2:
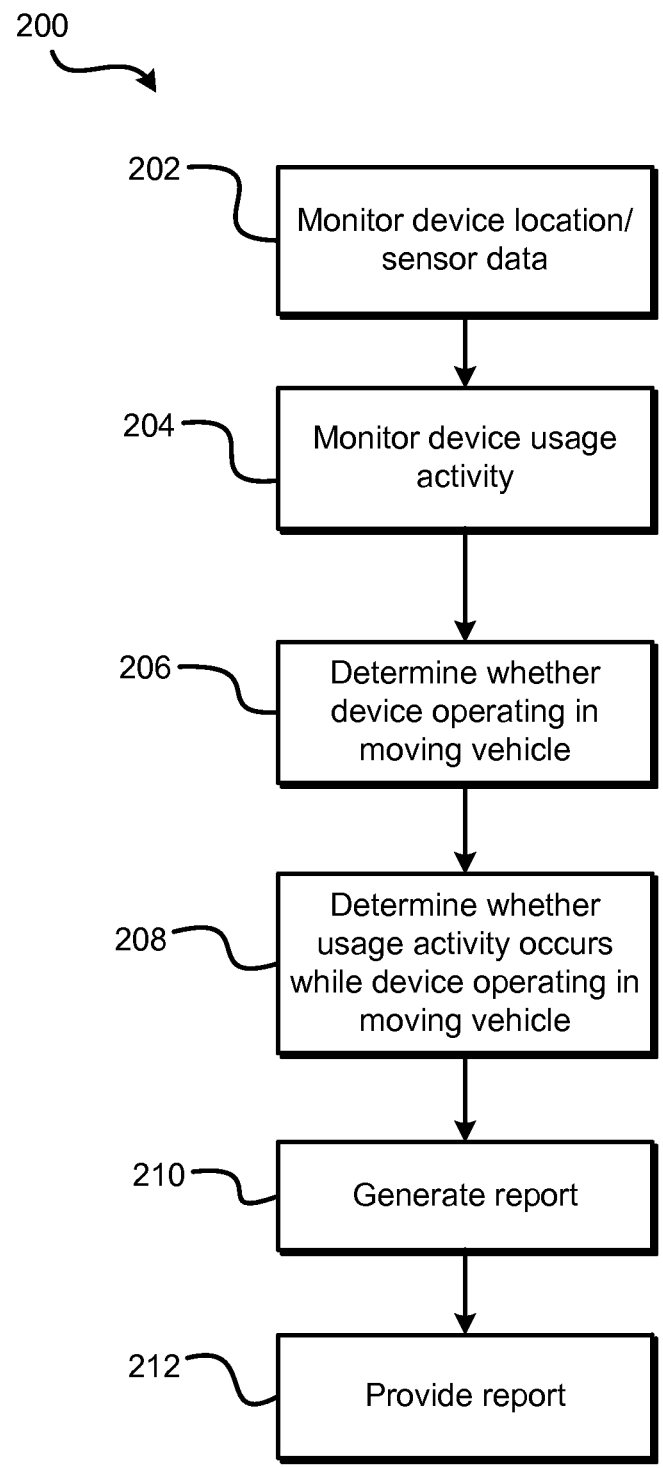
FIGS. 2 and 3 are flowcharts showing methods of reporting device usage activity.

Referring to FIG. 2, a method 200 is shown for reporting usage activity of a device. The method 200 and associated processes are described with reference to the components shown in FIG. 1, including the reporting manager 20 and monitoring agent 13, which are preferably configured for performing the method 200. The method 200 may alternatively be performed via other suitable systems. The method 200 includes monitoring location data and/or sensor data of a particular mobile device 12 corresponding to a particular user (step 202). Usage activity occurring on the particular mobile device 12 is monitored, the usage activity including one or more of voice communication, electronic messaging, and application usage (step 204). A processor determines whether the particular mobile device 12 is operating in a moving vehicle based on the location data and/or the sensor data (step 206). It is further determined whether the usage activity occurs while the particular mobile device 12 is operating in a moving vehicle (step 208). A report is generated indicating whether the usage activity occurs while the particular mobile device 12 is operating in a moving vehicle (step 210), and the report is provided (step 212).

Figure 4:
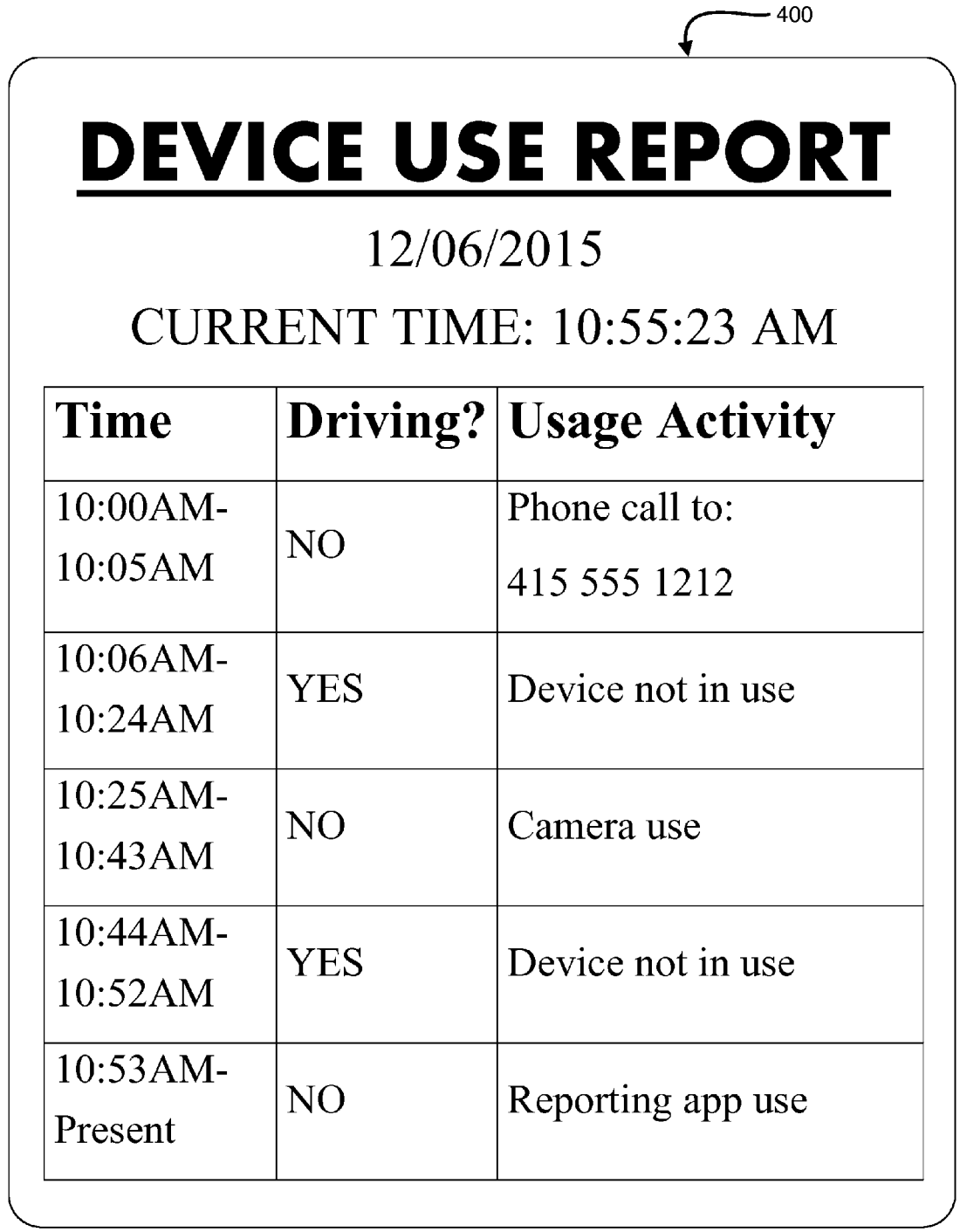
FIG. 4 shows an example mobile device usage activity report.

In one implementation of the method 200 software running on a mobile device 12 enables the monitoring agent 13 to monitor and record location/sensor data and usage activity, determine whether the device 12 has operated in a moving vehicle, and generate a report for example showing recent mobile device usage activity including application usage, telephone calls, text messages, picture messages, and other communications. This report can be displayed on a user interface 21 (e.g., display screen) of the mobile device 12, showing usage activity and lack thereof to the device user. An example report 400 is shown in FIG. 4.

Monitoring and recording can be done at the network layer for example by a telecommunication carrier system 42, in addition to or instead of having an application enabling a monitoring agent 13 on a user's mobile device 12. The monitoring and recording can alternatively be performed by an application running on a computer ("CPU") 50 in a vehicle 60, so that the vehicle CPU 50 is in a position to verify whether or not there was mobile device usage activity while the vehicle 60 is in operation or being driven. When the mobile device 12 is located in the vehicle 60, the vehicle CPU 50 of the vehicle 11 can maintain wired communication or wireless radio communication with the mobile device 12. The vehicle CPU 50 detects the presence of the mobile device 12 within the vehicle 11 based on the wired or wireless communication. The vehicle CPU 50 can further determine whether the vehicle 60 is being driven, for example whether the vehicle transmission is engaged in a drive mode or whether the vehicle drivetrain is in motion, which information can be provided to the monitoring agent 13 on the mobile device 12 via wired or wireless communication. In such case, monitoring of location data and/or sensor data of the mobile device 12 can include receiving by the mobile device 12 an indication from the vehicle CPU 50 indicating that the vehicle 60 is being driven. The CPU 50 can further monitor the usage activity of the mobile device 12, determine whether the usage activity occurs while the mobile device 12 is operating while the vehicle is moving, and generate the report.

In an exemplary implementation, a user of a mobile device 12 who has been pulled over in a vehicle 60 by a police officer in a police cruiser 70 for an alleged traffic violation can provide the mobile device 12 to the police officer showing the displayed report on the user interface 21. The report, for example the report 400, can provide evidence that the user, the vehicle driver, was not recently engaged with their mobile device 12 before being pulled over. The generated report can match any recent device activity to whether or not the user was likely driving at that time. For example in the report 400 it is shown that between the time of 10:44 AM and 10:52 AM the user was driving but the mobile device 12 was not in use. Additionally, the report can list all recent activity as shown in the report of FIG. 4. Alternatively, a report can be provided to a device in the police officer or other party's possession, for example the computing device 16. A mechanism can be enabled, for example by the reporting manager 20, for a driver to give permission for a police officer or other party to access the report, which report can be hosted on a website enabled by the reporting manager 20 accessible to internet-connected devices. The report can further be printed via an output device and mailed to a driver or other party.

In a particular implementation, the reporting manager 20 can receive data from the monitoring agent 13 for preparing the report and deliver the report to a requesting party. The reporting manager 20 via a carrier interface 22 can alternatively or additionally access location data and/or usage data gathered at a network layer by a telecommunication carrier system 42 to make the determination of whether the mobile device 12 is operating in a moving vehicle and whether usage activity occurs while the mobile device 12 is operating in a moving vehicle. A telecommunication carrier system 42 can for example render data accessible from an in-network position determining entity (PDE) 44 which tracks position of a mobile device 12 based on its communication with various base transceiver stations (BTS) in a network.

The reporting manager 20 can receive a request for the report from a device 16 corresponding to a police department, for example from a police officer performing a traffic stop of a user of the mobile device 12, from a court of law, for example from a prosecutor handling a distracted driving charge against the user of the mobile device 12, or from another party with a desire to know about usage activity of the mobile device 12. The reporting manager 20 can provide the report via the reporting application 30 to the computing device 16. Alternatively, the report can be provided to a particular party via email, electronic message (e.g., SMS, MMS), or other suitable protocol.

The report can be provided responsive to a request from the user (e.g., police department, court of law) of the computing device 16 or a request from the monitored user of the mobile device 12. For example the monitored user can provide a request via the monitoring agent 13 to transmit a report from the reporting manager 20 to a particular police officer via email, electronic message (e.g., SMS, MMS), or other suitable protocol during a traffic stop where the police officer alleges the mobile device was being used while the monitored user's vehicle was in motion in violation of a law. Further, the report can be provided to any particular representative of a police department or a court of law responsive to the request.

A user permission can be required prior to providing the report to a police department, court of law, or other party which requests the report from the reporting manager 20 through the network 40. The reporting manager 20 can request a permission responsive to a report request from a user (e.g., police department, court of law) of the computing device 16. The user of the mobile device 12, can provide permission to the reporting manager 20 via the monitoring agent 13 responsive to the reporting manager 20 request. The report is thereafter generated or provided to the party requesting the report responsive to receiving the permission from the user of the mobile device 12.

Reports and data for preparing reports can be saved for later use. For example, a driver who is pulled over and receives a traffic citation for suspected use of their mobile device 12 could request a report at that moment, soon thereafter, or at a later date. The report could then be saved to the user database 34 to be used as evidence if the driver wishes to contest the traffic citation at a later date.

Other behaviors and actions related to safe driving and law enforcement can be monitored by the reporting manager 20 or monitoring agent 13. For example, the monitoring agent 13 can monitor location data and/or the sensor data and generate audits indicating driving quality for cases where a driver is suspected of speeding, weaving, failing to yield, failing to stop at stop signs, and/or accelerating and decelerating quickly, or otherwise operating a motor vehicle in an unsafe manner. This information can be provided in a report of driving quality alone or in combination with the determination of whether mobile device usage activity occurs while the particular mobile device is operating in a moving vehicle.

A payment from the monitored user of the mobile device 12 or other party requesting a report may be a requirement for providing a report. The reporting application 30 is configured to receive an indication of a monetary transaction by the monitored user or other party and provide the report to the monitored user or other party responsive to the indication of the monetary transaction. For example the monitored user can provide a request via the monitoring agent 13 to transmit a report from the reporting manager 20 to a particular party (e.g., a police department), and the reporting manager 20 can require payment from the monitored user as a requirement to process the request and provide the report to the particular party.

The monitoring agent 13 can attempt to detect driving for the purpose of deciding when to begin monitoring and recording usage activity. Usage activity can be monitored and recorded for example in response to determining that the mobile device 12 is operating in a moving vehicle. Alternatively, the recording process can be started manually by the user, started at set times or set locations, and/or started by another application. Location/sensor data and usage activity can be monitored and recorded in response to a user input to the mobile device 12 or based on a predetermined time schedule. Such schedule can be user-defined. Usage activity can be monitored in response to determining that the mobile device 12 is in a particular geographic area. Alternatively, usage activity can be monitored and recorded continuously. For example the monitoring agent 13 can be set to "always on", always recording and available to generate a report of recent usage activity.

A datastore of laws and regulations corresponding to different geographic areas is provided so that reports generated by the monitoring manager 13 or the reporting manager 20 can take into account local laws and regulations. A law datastore 26 can for example be provided on a network connectable computing system enabling the reporting manager 20, or alternatively, a law datastore 23 can be provided locally on the mobile device 12 on which the monitoring agent 13 is executed. Using the law datastore 23, 26, the monitoring agent 13 can for example adjust what the mobile device 12 is allowed to do when the monitored user is driving a vehicle, inform the monitored user of local laws or regulations in a geographic area in which the monitored user is driving, and/or warn the monitored user when their device usage activity is not allowed by local law. The monitoring agent 13 can further render the law/regulation information accessible to other applications on the mobile device 12, which applications can for example use such data for determining what features of the mobile device 12 to allow or restrict when the monitored user is driving in different localities.

The monitoring agent 13 is configured to determine acceptable usage activity based on a particular geographic location of the mobile device 12 corresponding to the monitored location data. Acceptable usage activity can be determined by comparing the particular geographic location with a datastore 23, 26 of traffic laws and traffic regulations for a particular region including the particular geographic location. The monitoring agent 13 then compares the determination of whether the usage activity occurs while the particular mobile device is operating in a moving vehicle with the determined acceptable usage activity, to determine whether the monitored usage activity is unacceptable, and generates a report indicating whether the monitored usage activity is unacceptable. For example, in a particular locality, text messaging and phone use is illegal while driving, and therefore, text messaging and phone use is unacceptable usage activity when the mobile device 12 is determined to be located in that particular locality. If it is determined that the monitored user makes a phone call or generates or sends a text message with the mobile device 12 while in a moving vehicle in the particular locality, the report indicates that such usage activity is unacceptable. Such report can include a detailed description of the traffic laws and traffic regulations corresponding to the particular geographic location. The report can be provided to the user of the particular mobile device.

The monitoring agent 13 is optionally configured to restrict one or more functional components of the mobile device 12 when the mobile device 12 is located in a geographic area where use of such functional components is unacceptable based on law, regulation or other factor. Functional components can correspond to hardware, firmware, or software components which enable voice calling, electronic text messaging, application execution, or other features of the mobile device 12.

An individual can have multiple devices 12 in their possession. Monitored activity from the devices 12 can be aggregated, allowing for a more comprehensive report. A particular monitored user may operate a plurality of mobile devices 12 with respective monitoring agents 13 monitoring one or more of location data, sensor data, and usage activity on each device 12. In such case it can be determined whether any of the plurality of mobile devices 12 is operating in a moving vehicle based on the location data and/or the sensor data and whether usage activity occurs while one or more of the plurality of mobile devices 12 is operating in a moving vehicle. A report can be provided indicating whether the usage activity occurs while one or more of the plurality of mobile devices is operating in a moving vehicle. In such manner for example, if a first mobile device 12 from which a phone call is made is not configured for determining whether it is operating in a moving vehicle, for example a cell phone not equipped with a location determining resource or an accelerometer, such determination can be made based on data from a second mobile device 12 and a report can be generated based on information received from both the first and second mobile devices providing such devices correspond to the same user. Such information can be aggregated for example by the reporting manager 20, or alternatively by the monitoring agents 13 on the mobile devices 12.

The reporting manager 20 or monitoring agent 13 can aggregate information across multiple users to generate geographic reports about areas where drivers are or are not in compliance with safe driving guidelines and/or specific local laws or regulations. Such data can for example be made available to drivers for educational purposes. Such data can be used to assign safety scores to regions, cities, neighborhoods, or specific roads and routes. Safety scores can be used by a route finding algorithm implemented by the analytics engine 24 based on data in the mapping datastore 28 to determine potentially safer routes where fewer drivers are using or tend to use their devices 12 while driving. Further, such data can be made available to police departments for purposes of tailoring law enforcement efforts, or made available to insurance companies for purposes of establishing risk, either on the level of individuals or on the level of populations.

Figure 3:
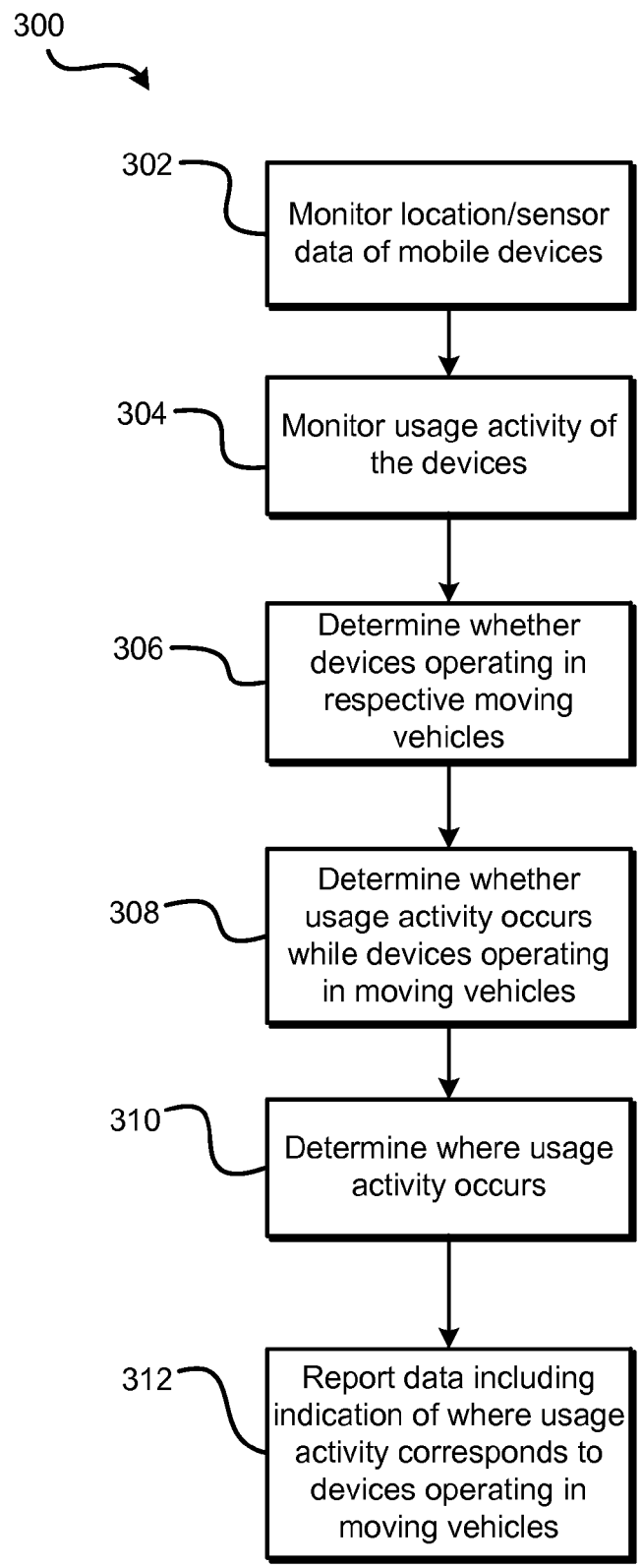

Referring to FIG. 3, a data dissemination method 300 is shown for reporting usage activity of a plurality of devices. The method 300 and associated processes are described with reference to the components shown in FIG. 1, including the reporting manager 20 and monitoring agent 13, which are preferably configured for performing the method 300. The method 300 may alternatively be performed via other suitable systems. The method 300 includes monitoring location data and/or sensor data of a plurality of mobile devices 12 corresponding to a plurality of users (step 302). Usage activity occurring on the plurality of mobile devices 12 is monitored, the usage activity including one or more of voice communication, electronic messaging, and application usage (step 304). It is determined whether the plurality of mobile devices are operating in respective moving vehicles based on the location data and/or the sensor data (step 306). Further, it is determined whether the usage activity occurs while the plurality of mobile devices are operating in respective moving vehicles (step 308), and it is determined where the monitored usage activity occurs based on the at least one of the location data and the sensor data of the plurality of mobile devices (step 310). Data is reported by the reporting manager 20 comprising an indication of where the monitored usage activity corresponds to the plurality of mobile devices operating in respective moving vehicles (step 312).

Reported data can also include an explicit indication of where the monitored usage activity does not correspond to the plurality of mobile devices operating in respective moving vehicles. Reported data can further comprise an indication of when the monitored usage activity corresponds to the plurality of mobile devices operating in respective moving vehicles.

Predetermined guidelines can be used to determine acceptable mobile device usage activity for the plurality of mobile devices 12, for example by comparing respective geographic locations corresponding to the location data with a datastore of traffic laws and/or traffic regulations for a particular region comprising the geographic locations. The reporting manager 20 via the analytics engine 24 can compare the determination of whether the usage activity occurs while the plurality of mobile devices are operating in respective moving vehicles with the determined acceptable usage activity, to determine whether the monitored usage activity is unacceptable respectively for the plurality of mobile devices. The analytics engine 24 with access to the mapping datastore 28 can further assign one or more safety scores to a particular geographic area (e.g., a region, a city, a neighborhood, a road, a street, or a route) based on the determination of where the monitored usage activity occurs and whether the usage activity occurs while the plurality of mobile devices are operating in respective moving vehicles. The analytics engine 24 using data in the mapping datastore 28 can further determine a route based on the determination of where the monitored usage activity occurs and whether the usage activity occurs while the plurality of mobile devices are operating in respective moving vehicles. For example, such route can be provided to a user of the mobile device 12 responsive to the user's request via the monitoring agent 13 for navigation assistance to a particular destination.

The reporting manager 20 can report data comprising an indication of where the monitored usage activity is unacceptable for the plurality of mobile devices 12 and, if assigned, one or more safety scores. The report data can further include indications of the traffic laws and/or traffic regulations corresponding to the respective geographic locations. Reported data can be provided in the form of a map including one or more safety scores if assigned corresponding to a particular geographic area.

Figure 5:
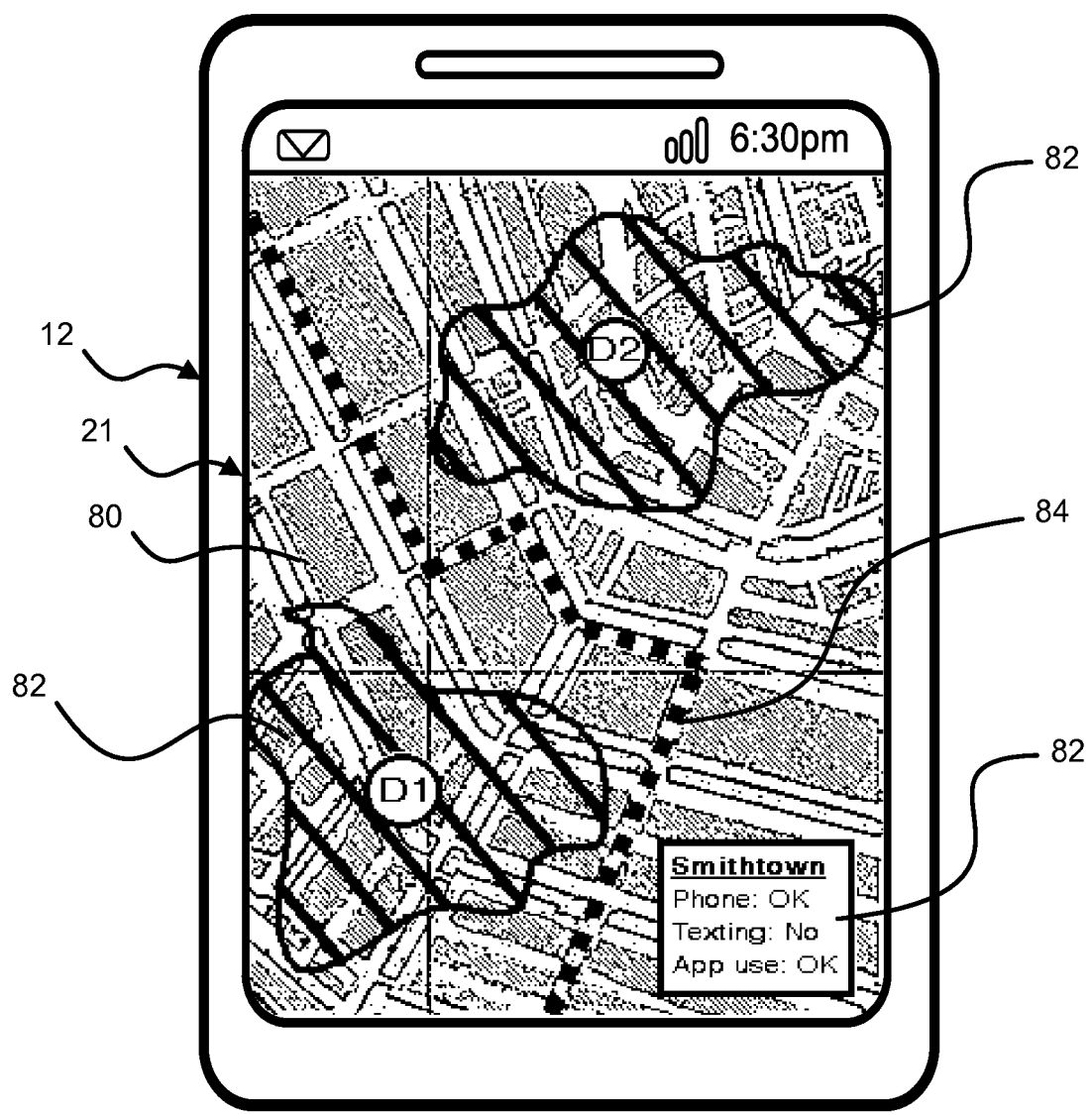
FIG. 5 shows a mobile device displaying an exemplary display with geographic map pursuant to described methods.

FIG. 5 shows exemplary data reported by the reporting manager 20 in the form of a map 80 displayed on the user interface 21 of a mobile device 12. Danger zones 82 correspond to areas where mobile device users 12 are determined to have often engaged in usage activity while driving. Safety scores D1 and D2 respectively corresponding to a high danger risk (D1) and a relatively lower safety risk (D2) are shown for the danger zones 82. Based on a user navigation request, a route 84 avoiding the danger zones 82 is generated and displayed on the map 80. A notification box 86 provides an indication of a geographic area where the mobile device 12 is located based on data from a location determining resource 15 (the city "Smithtown"). The notification box 86 further provides indications of traffic laws and/or traffic regulations corresponding to Smithtown by indicating whether phone use, electronic text messaging, and application use are prohibited while driving in Smithtown. As shown, phone use and application use while driving is not prohibited in Smithtown ("OK"), but sending text messages is prohibited in Smithtown ("No").

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A navigation method comprising:
   monitoring at least one of location data or sensor data of a plurality of mobile devices corresponding to a plurality of users;
   monitoring usage activity occurring on the plurality of mobile devices comprising at least one of voice communication, electronic messaging, or application usage;
   determining whether the plurality of mobile devices are operating in respective moving vehicles based on the at least one of the location data or the sensor data;
   determining whether the usage activity occurs while the plurality of mobile devices are operating in respective moving vehicles;
   determining where the monitored usage activity occurs based on the at least one of the location data or the sensor data of the plurality of mobile devices;
   receiving a navigation request via a particular mobile device;
   determining by a processor a route based on the determination of where the monitored usage activity occurs and whether the usage activity occurs while the plurality of mobile devices are operating in the respective moving vehicles; and
   providing by the processor via the particular mobile device navigation assistance comprising the determined route.

2. The method of claim 1, further comprising displaying the route on a user interface of the particular mobile device.

3. The method of claim 1, further comprising for each one of the plurality of mobile devices, monitoring the usage activity responsive to determining that the one of the plurality of mobile devices is operating in a moving vehicle.

4. The method of claim 1, further comprising for each one of the plurality of mobile devices monitoring the usage activity responsive to a user input to the one of the plurality of mobile devices.

5. The method of claim 1, further comprising monitoring the usage activity based on a predetermined time schedule.

6. The method of claim 1, further comprising:
   determining that the plurality of mobile devices are in a particular geographic area based on the location data; and
   enabling monitoring of the usage activity when the plurality of mobile devices are determined to be in the particular geographic area.

7. The method of claim 1 wherein monitoring of at least one of the location data, the sensor data, or the usage activity of the plurality of mobile devices is performed at a network layer by a telecommunication carrier system.

8. The method of claim 1, further comprising for each one of the plurality of mobile devices enabling the monitoring of the at least one of the location data or the sensor data by an application executed on a computing system of a vehicle in which the one of the plurality of mobile devices is located, the computing system of the vehicle being in at least one of wired communication or wireless radio communication with the one of the plurality of mobile devices.

9. The method of claim 8, wherein the computing system of the vehicle further:
   monitors the usage activity;
   determines whether the usage activity occurs while the one of the plurality of mobile devices is operating while the vehicle is moving with the one of the plurality of mobile devices inside the vehicle; and
   generates the route.

10. The method of claim 1, further comprising:
    determining acceptable usage activity based on a particular geographic location of the plurality of mobile devices corresponding to the location data;
    comparing the determination of whether the usage activity occurs while the plurality of mobile devices are operating in respective moving vehicles with the determined acceptable usage activity, to determine whether the monitored usage activity is unacceptable;
    determining the route further based on whether the monitored usage activity is unacceptable.

11. The method of claim 10, wherein the acceptable usage activity is determined by comparing the particular geographic location with a datastore of at least one of traffic laws or traffic regulations for a particular region comprising the particular geographic location.

12. The method of claim 1, further comprising:
    determining a quality of driving corresponding to the plurality of mobile devices based on at least one of the location data or the sensor data; and
    determining the route further based on the quality of driving.

13. The method of claim 1, wherein for each one of the plurality of mobile devices, the monitoring of the at least one of the location data or of the sensor data comprises receiving an indication from a vehicle computing system indicating, via at least one of a wired or wireless communication, that a vehicle in which one of the plurality of mobile devices is located is being driven.

14. The method of claim 1, wherein the determined route is further based on a particular time when the monitored usage activity corresponds to the plurality of mobile devices operating in respective moving vehicles.

15. The method of claim 1, further comprising:
determining acceptable usage activity based on predetermined guidelines;
comparing the determination of whether the usage activity occurs while the plurality of mobile devices are operating in respective moving vehicles with the determined acceptable usage activity, to determine whether the monitored usage activity is unacceptable respectively for the plurality of mobile devices; and
determining the route further based on where the monitored usage activity is unacceptable for the plurality of mobile devices.

16. The method of claim 1, further comprising:
determining acceptable usage activity based. on respective geographic locations of the plurality of mobile devices corresponding to the location data;
comparing the determination of whether the usage activity occurs while the plurality of mobile devices are operating in respective moving vehicles with the determined acceptable usage activity, to determine whether the monitored usage activity is unacceptable respectively for the plurality of mobile devices; and
determining the route further based on where the monitored usage activity is unacceptable for the plurality of mobile devices.

17. The method of claim 16, wherein the acceptable usage activity is determined by comparing the respective geographic locations with a datastore of at least one of traffic laws or traffic regulations for a particular region comprising the respective geographic locations.

18. The method of claim 17, further comprising providing a report comprising an indication of at least one of traffic laws or traffic regulations corresponding to the respective geographic locations.

19. The method of claim 1, further comprising:
assigning a safety score to a particular geographic area based on the determination of where the monitored usage activity occurs and whether the usage activity occurs while the plurality of mobile devices are operating in respective moving vehicles; and
determining the route based on the assigned safety score.

20. The method of claim 1, further comprising:
assigning a plurality of safety scores to a particular geographic area based on the determination of where the monitored usage activity occurs and whether the usage activity occurs while the plurality of mobile devices are operating in. respective moving vehicles; and
displaying a map showing the plurality of safety scores corresponding to the particular geographic area.

21. The method of claim 20, wherein the particular geographic area comprises at least one of a region, a city, a neighborhood, a road, a street, or a route.

22. The navigation method of claim 1, further comprising providing an application on the plurality of mobile devices and the particular mobile device executable by one or more processing units to implement a method, which application:
enables monitoring by the plurality of mobile devices of the at least one of the location data or the sensor data of the plurality of mobile devices corresponding to a plurality of users;
enables monitoring by the plurality of mobile devices of the usage activity occurring on the plurality of mobile devices comprising the at least one of the voice communication, electronic messaging, or application usage;
enables the determining of whether the plurality of mobile devices are operating in respective moving vehicles based on the at least one of the location data or the sensor data;
enables the determination of whether the usage activity occurs while the plurality of mobile devices are operating in respective moving vehicles;
enables the determining of where the monitored usage activity occurs based on the at least one of the location data or the sensor data of the plurality of mobile devices;
enables the receiving of the navigation request via the particular mobile device;
enables determining by the particular mobile device of the route; and
enables providing by the particular mobile device the navigation assistance.

23. The navigation method of claim 1, further comprising:
determining a plurality of safety scores corresponding to where usage activity occurs while the plurality of mobile devices are operating in respective moving vehicles; and
determining the route based on the safety scores.

24. The navigation method of claim 1, wherein the plurality of mobile devices comprise the particular mobile device.

25. A navigation method comprising:
receiving a navigation request from a user via a particular mobile device;
monitoring by a plurality of mobile devices corresponding to a plurality of users at least one of location data or sensor data of the plurality of mobile devices;
monitoring by the plurality of mobile devices usage activity occurring on the plurality of mobile devices comprising at least one of voice communication, electronic messaging, or application usage;
determining by the plurality of mobile devices whether the plurality of mobile devices are operating in respective moving vehicles based on the at least one of the location data or the sensor data;
determining by the plurality of mobile devices whether the usage activity occurs while the plurality of mobile devices are operating in respective moving vehicles;
determining by the plurality of mobile devices where the monitored usage activity occurs based on the at least one of the location data or the sensor data of the plurality of mobile devices;
determining a route by the particular mobile device based on the determination of where the monitored usage activity of the plurality of mobile devices occurs and whether the usage activity occurs while the plurality of mobile devices are operating in the respective moving vehicles; and
providing by the particular mobile device navigation assistance to the user comprising the determined route.

26. The navigation method of claim 25, further comprising:
receiving and aggregating data via a network by at least one of the particular mobile device and a computing system in network communication with the particular mobile device from the plurality of mobile devices, the data corresponding to determinations of where the usage activity occurs while the plurality of mobile devices are operating in respective moving vehicles; and determining the route by the particular mobile device based on the aggregated data.

27. The method of claim 25, further comprising providing an application on the plurality of mobile devices executable by at least one processor to implement a method, which application:
- enables the monitoring by the plurality of mobile devices the at least one of the location data or sensor the data of the plurality of mobile devices;
- enables the monitoring by the plurality of mobile devices the usage activity occurring on the plurality of mobile devices;
- enables the determining by the plurality of mobile devices of whether the plurality of mobile devices are operating in respective moving vehicles;
- enables the determining by the plurality of mobile devices of whether the usage activity occurs while the plurality of mobile devices are operating in the respective moving vehicles; and
- enables the determining by the plurality of mobile devices where the monitored usage activity occurs.

28. The method of claim 25, further comprising providing an application on the particular mobile device executable by at least one processor to implement a method, which application:
- enables receiving the navigation request from the user;
- enables determining the route by the particular mobile device; and
- enables providing by the particular mobile device the navigation assistance comprising the determined route.

29. A computer network comprising:
- a plurality of mobile devices corresponding to a plurality of users comprising a plurality of respective non-transitory computer readable storage mediums having encoded thereon instructions that, when executed by a plurality of respective processors, cause the plurality of mobile devices to perform a process comprising:
  - monitoring at least one of location data or sensor data of the plurality of mobile devices;
  - monitoring usage activity occurring on the plurality of mobile devices comprising at least one of voice communication, electronic messaging, or application usage;
  - determining whether the plurality of mobile devices are operating in respective moving vehicles based on the at least one of the location data or the sensor data; and
  - determining whether the usage activity occurs while the plurality of mobile devices are operating in respective moving vehicles; and
  - determining where the monitored usage activity occurs based on the at least one of the location data or the sensor data of the plurality of mobile devices; and
- a particular mobile device comprising at least one particular non-transitory computer readable storage medium having encoded thereon instructions that, when executed by one or more particular processors, cause the particular mobile device to perform a particular process comprising:
  - receiving a navigation request from a user;
  - receiving via a network an indication of the determination o where the monitored usage activity of the plurality of mobile devices occurs and whether the usage activity occurs while the plurality of mobile devices are operating in the respective moving vehicles;
  - determining a route based on the determination of where the monitored usage activity of the plurality of mobile devices occurs and whether the usage activity occurs while the plurality of mobile devices are operating in the respective moving vehicles; and
  - providing by the particular mobile device navigation assistance to the user comprising the determined route.

* * * * *

UNITED STATES PATENT AND TRADEMARK OFFICE
CERTIFICATE OF CORRECTION

PATENT NO. : 9,444,929 B2  
APPLICATION NO. : 14/324938  
DATED : September 13, 2016  
INVENTOR(S) : Hodges et al.

Page 1 of 1

It is certified that error appears in the above-identified patent and that said Letters Patent is hereby corrected as shown below:

In the Claims

At Claim 13, at Column 10, Line 63, delete "or of the sensor data" and insert therefore -- or the sensor data --.

At Claim 13, at Column 10, Line 65, delete "least- one" and insert therefore -- least one --.

At Claim 29, at Column 14, Line 24, delete "o" and insert therefore -- of --.

Signed and Sealed this
Twenty-first Day of February, 2017

Michelle K. Lee
*Director of the United States Patent and Trademark Office*